United States Patent [19]

Alongi et al.

[11] Patent Number: 4,698,634
[45] Date of Patent: Oct. 6, 1987

[54] SUBSURFACE INSPECTION RADAR

[76] Inventors: Anthony V. Alongi, 6865 Walmore Rd., Niagara Falls, N.Y. 14304; Anthony J. Alongi, 4214 Washington St., Niagara Falls, N.Y. 14305

[21] Appl. No.: 753,695

[22] Filed: Jul. 10, 1985

[51] Int. Cl.[4] .............................................. G01S 7/28
[52] U.S. Cl. .................................... 342/22; 342/159; 324/337
[58] Field of Search .............. 343/5 NA, 5 PD, 13 R; 324/337; 342/22, 159; 73/579

[56] References Cited

U.S. PATENT DOCUMENTS

| 3,806,795 | 4/1974 | Morey | 324/337 |
|---|---|---|---|
| 3,831,173 | 8/1974 | Lerner | 343/5 NA |
| 3,967,282 | 6/1976 | Young et al. | 343/5 NA |
| 4,008,469 | 2/1977 | Chapman | 343/5 NA |
| 4,062,010 | 12/1977 | Young et al. | 343/5 NA |
| 4,072,942 | 2/1978 | Alongi | 343/5 NA |
| 4,128,011 | 12/1978 | Savage | 73/579 |
| 4,583,095 | 4/1986 | Peterson | 343/5 NA |

OTHER PUBLICATIONS

W. Brown, "Lunar Subsurface Exploration with Coherent Radar"; Moon, (vol. 4, No. 1-2; 4/72; pp. 113-127).

Dolphin et al., "Radar Probing of Victorio Peak"; Geophysics, (vol. 43, No. 7; 12/78; pp. 1441-1448).

Annan et al., "Impulse Radar Sounding in Permafrost"; Radio Science, (vol. 11, No. 4; 4/76; pp. 383-394).

Primary Examiner—T. H. Tubbesing
Assistant Examiner—Bernarr Earl Gregory
Attorney, Agent, or Firm—Christel, Bean & Linihan

[57] ABSTRACT

A radar system for subsurface inspection comprising a short pulse transmitter, an antenna for radiating signals to and receiving external reflections from the surface and from below the surface being inspected, a receiver connected to the antenna for generating an output signal in response to the external reflections, and a clutter cancellation circuit for eliminating internal reflections developed in the system to prevent interference by such internal reflections with the desired external reflections to enhance the system detection capability and reliability of evaluation of such external reflections. Clutter cancellation is accomplished by storing the internally generated clutter and subsequently subtracting it from each incoming radar range sweep consisting of surface and subsurface signals plus unwanted clutter. An internal signal recognition circuit rejects all return signals except that generated internally to the radar by the antenna structure, and this internal antenna echo is used as an internal reference signal whereby the radar system is relatively insensitive to wide variations in external reflection characteristics caused by wide variations in the nature of materials present in the surface being inspected. This in turn provides for a reliable control of the receiver sampling process which is indpendent of external signals and of their amplitude variations. A circuit for compensating for thermal drift permits long term cancellation of the internally generated clutter. The drift compensation circuit, the internal signal recognition circuit and the receiver provide a closed loop stabilization to allow the internal clutter to remain correlated on a range sweep by range sweep basis.

17 Claims, 27 Drawing Figures

TRANSMITTED WAVEFORM

INTERNAL CLUTTER TO BE ELIMINATED

SURFACE AND SUBSURFACE SIGNALS WITH CLUTTER

SURFACE AND SUBSURFACE SIGNALS WITHOUT CLUTTER

CUTAWAY VIEW OF HIGHWAY PAVEMENT

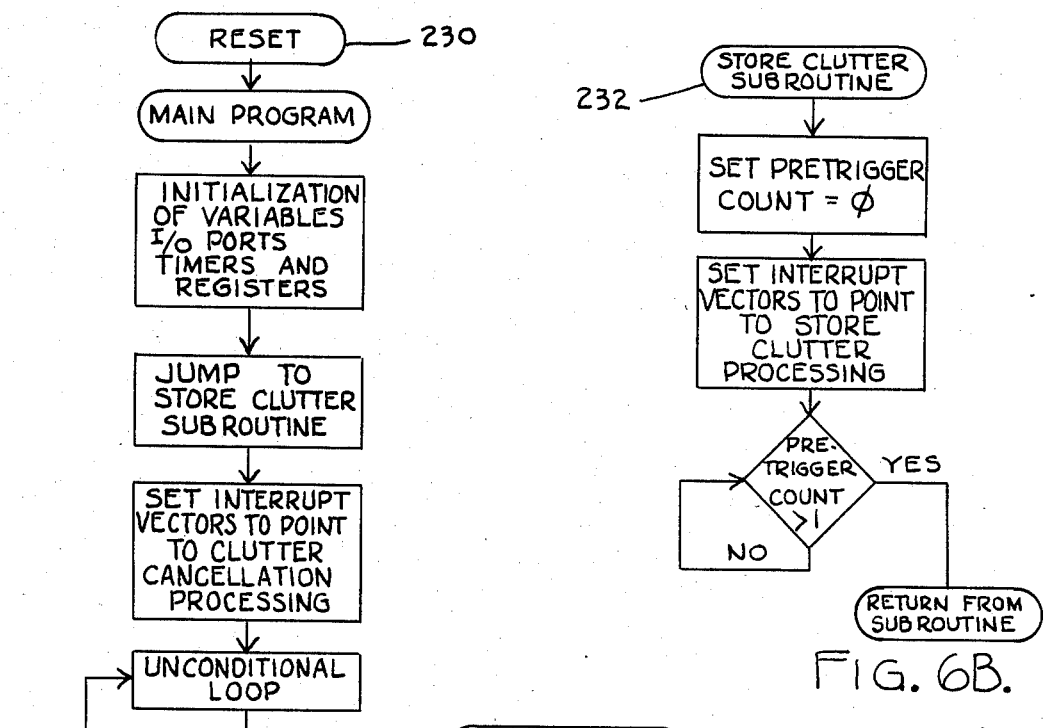
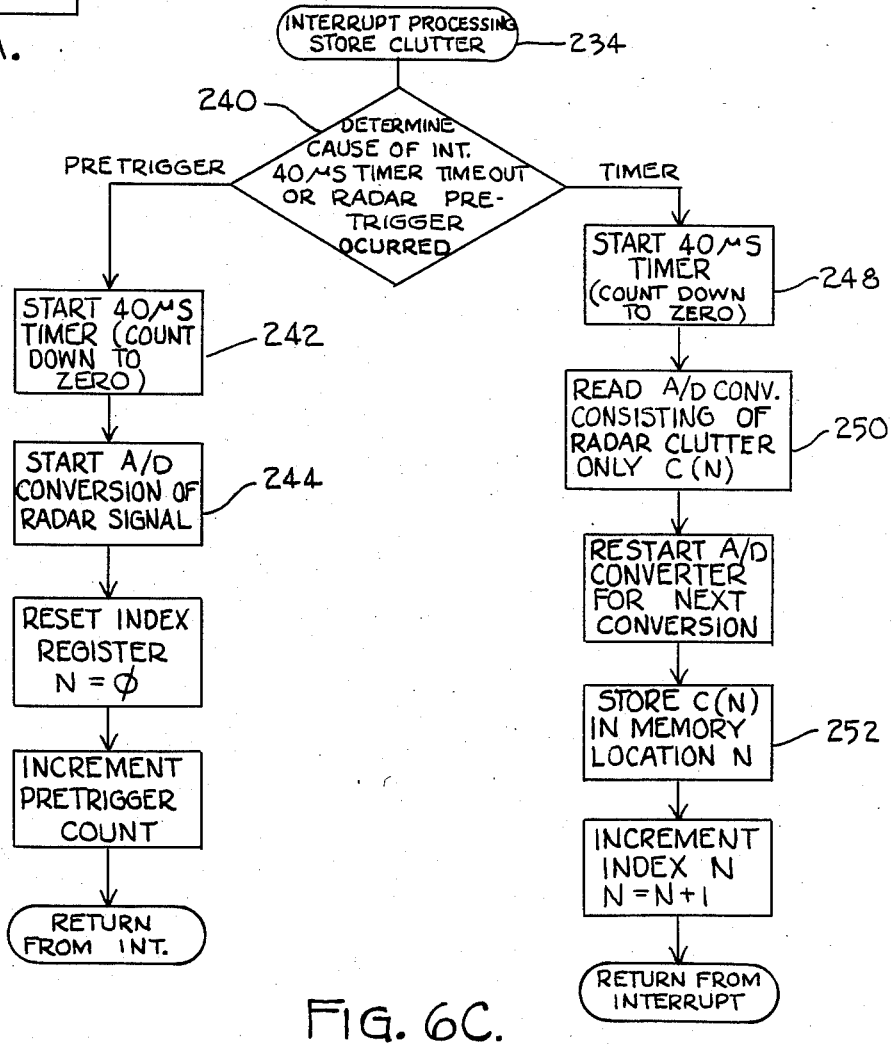
FIG. 6A.
FIG. 6B.
FIG. 6C.

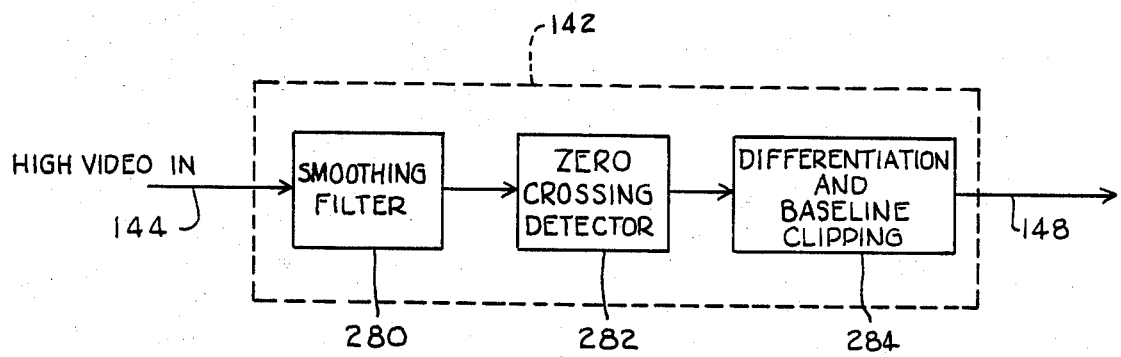
FIG. 7.
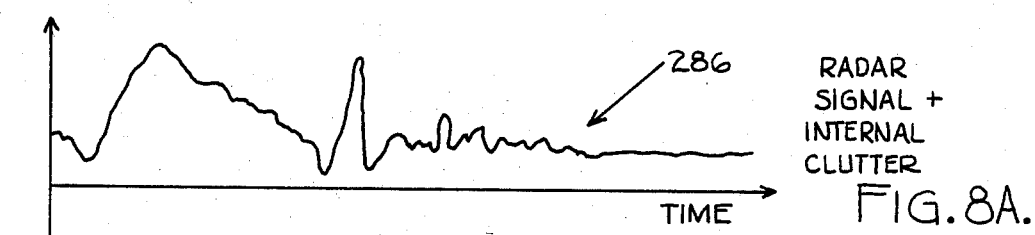
FIG. 8A.
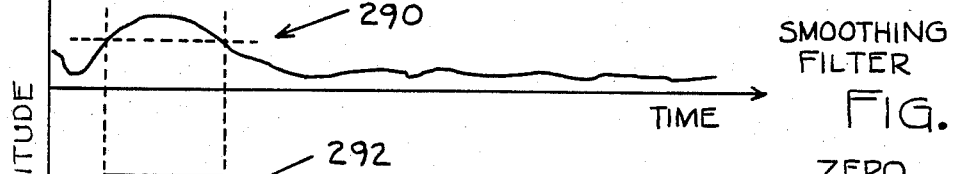
FIG. 8B.
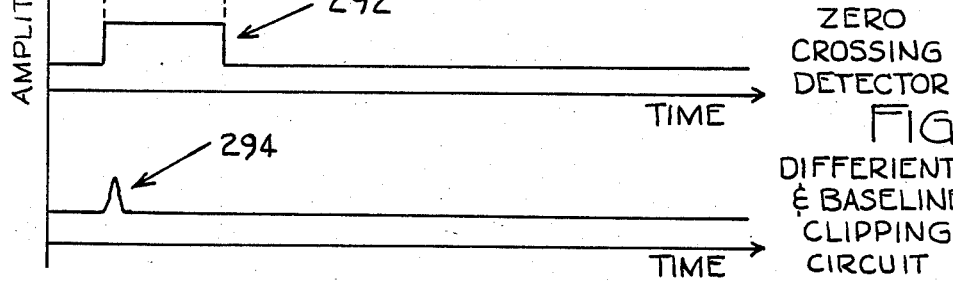
FIG. 8C.
FIG. 8D.

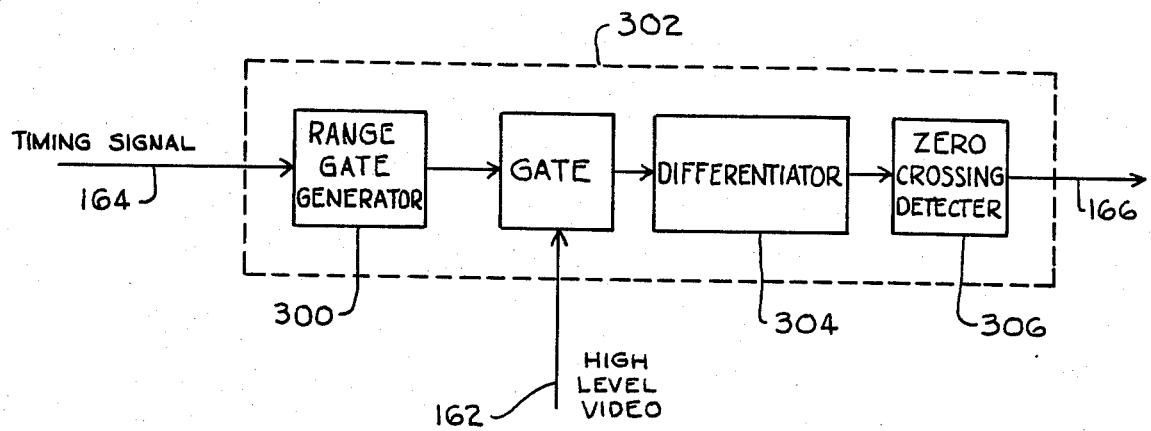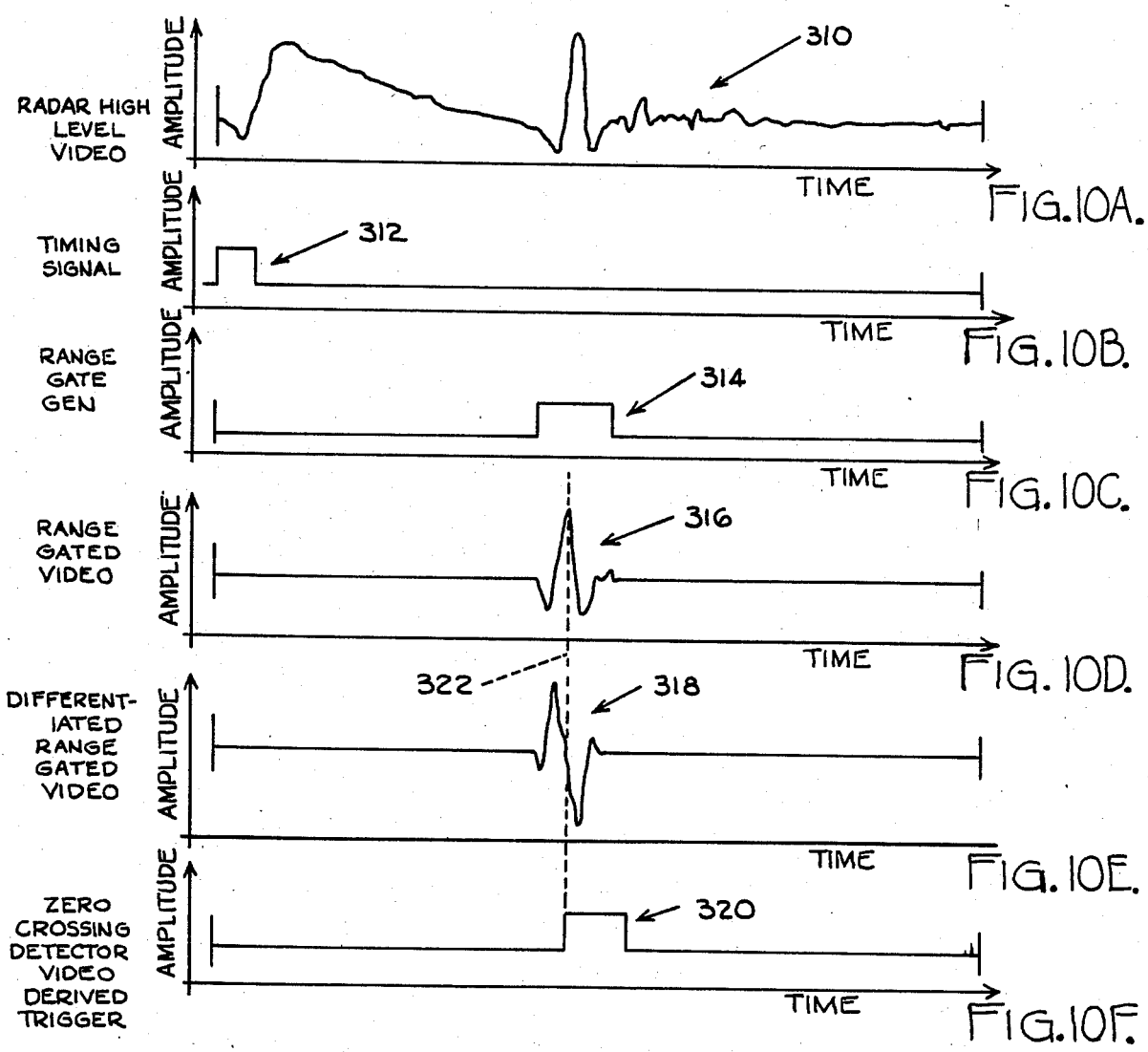

SUBSURFACE INSPECTION RADAR

BACKGROUND OF THE INVENTION

This invention relates to the art of radar systems, and more particularly to a new and improved short pulse high resolution radar system and method for subsurface inspection.

One area of use of the present invention is subsurface inspection of non-metallic building materials such as pavements of highways and bridge decks and similar roadway surfaces, although the principles of the present invention can be variously applied. A downward looking, short pulse high resolution radar for subsurface inspection is different from conventional radars in that it generally has a limited range capability, on the order of several feet as compared to several hundred miles for a conventional radar. The term subsurface is intended to include the region immediately adjacent and below the exposed, visible, outside or external surface of the pavement or other medium being inspected. Also, the free space resolution in the short pulse system is on the order of a few inches, i.e. it can separate in distance two targets a few inches apart, whereas the conventional system can separate in distance two objects no less than several hundred feet apart. The inherent resolution of any radar system is directly related to the duration of the transmitted pulse or its bandwidth. The shorter the pulse or wider the bandwidth the higher the resolution of the system. For example, a one nanosecond pulse has a resolution of 5.9 inches in free space or about 2.25 inches in concrete. For a ground probing, high resolution radar the design represents a compromise between wide bandwidth and lower center frequency. The lower the center frequency the greater the depth of penetration but the more difficult it is to achieve a wide bandwidth or high resolution system.

The typical highway inspection radar includes a short pulse transmitter, typically generating one cycle of RF and on the order of one nanosecond in duration. This signal is radiated by a downward looking, wide band, non-dispersive antenna which produces minimal transmitter signal distortion. The received signals or echoes from the target are coupled by the antenna into the sampling receiver. A sampling receiver converts a short pulse, very wide band signal to a narrow bandwidth signal. This process is identical to that employed by commercially available sampling oscilloscopes. The first external signal detected is the reflection from the surface of the pavement followed by reflections generated by disturbances from within the pavement, such as delamination or deterioration, and then followed by signals from the bottom of the pavement or below the pavement such as voids.

In addition to external signals detected by the receiver, internal multiple reflections generated by non-ideal system components such as the antenna, receiver, transmitter, transmission lines and RF connectors, also are detected. These internal multiple reflections or internal clutter interfere with the desired external echoes from within the pavement. This makes detection and classification of pavement disturbances difficult and also makes evaluation of the internal condition of the highway pavement less reliable. This source of clutter is the principle factor limiting system performance of inspection radars heretofore available. Thermal noise is not a significant problem with this type of very short range radar as it is with conventional radars. Therefore, a reduction in internal clutter alone would significantly enhance the system detection capability and reliability of evaluation in highway and bridge deck inspection. Earlier ground penetrating radars did not recognize the problem of eliminating internally generated clutter. The radar system and method of the present invention addresses this problem.

Another problem associated with earlier ground penetrating radars, especially non-ground-contacting radars, is the undesirable operation of the sampling receiver process which utilizes the first external echo arising from the ground surface to control the start of the sampling process. This problem arises due to the wide variation in amplitude of the surface echo because of wide variation in the reflective properties of the ground media which can include pavement, soil, sand, gravel and metal and rubber inserts such as expansion joints. The radar system and method also addresses this problem.

SUMMARY OF THE INVENTION

It is, therefore, a primary object of this invention to provide a new and improved short pulse radar system and method for subsurface inspection.

It is a more particular object of this invention to provides such a radar system and method having enhanced detection capability and reliability of evaluation of the surface being inspected.

It is a further object of this invention to provide such a radar system and method which eliminates internal multiple reflections or internal clutter in the system.

It is a further object of this invention to provide such a radar system and method which provides long term elimination of internally-generated clutter.

It is a further object of this invention to provide such a radar system and method having reliable control of the sampling receiver process which is independent of external signals and of their amplitude variations.

It is a further object of this invention to provide such a radar system and method which is efficient and effective in operation.

The present invention provides a radar system for subsurface inspection comprising short pulse transmitter means, antenna means for radiating signals to and receiving external reflections from the surface and from below the surface being inspected, receiver means connected to the antenna means for generating an output signal in response to the external reflections, and clutter cancellation means for eliminating internal reflections developed in the system to prevent interference by such internal reflections with the desired external reflections to enhance the system detection capability and reliability of evaluation of such external reflections. Clutter cancellation is accomplished by storing the internally generated clutter and subsequently subtracting it from each incoming radar range sweep consisting of surface and subsurface signals plus unwanted clutter. The system further includes internal signal recognition means for rejecting all return signals except that generated internally to the radar by the antenna structure, and this internal antenna echo is used as an internal reference signal whereby the radar system is relatively insensitive to wide variations in external reflection characteristics caused by wide variations in the nature of materials present in the surface being inspected. This in turn provides for a reliable control of the receiver sampling process which is independent of external signals and of their amplitude variations. The system also includes means for compensating for thermal drift to permit long term cancellation of the internally generated clutter. In particular there is provided drift compensation means which, along with the internal signal recognition means and the receiver means, provide a closed loop stabilization to allow the internal clutter to remain correlated on a range sweep by range sweep basis.

The foregoing and additional advantages and characterizing features of the present invention will become clearly apparent upon a reading of the ensuing detailed description together with the included drawing wherein:

BRIEF DESCRIPTION OF THE DRAWING FIGURES

FIGS. 6A-6D are program flow charts further illustrating operation of the clutter cancellation means of the present invention;

FIG. 7 is a block diagram of the internal signal recognition means of the system of FIG. 3;

FIGS. 8A-8D are graphs including waveforms illustrating operation of the internal signal recognition means of FIG. 7;

FIG. 9 is a block diagram of the video trigger circuit of the system of FIG. 3; and FIGS. 10A-10E are graphs including waveforms illustrating operation of the video trigger circuit of FIG. 9.

DETAILED DESCRIPTION OF THE ILLUSTRATED EMBODIMENT

Figure 1:
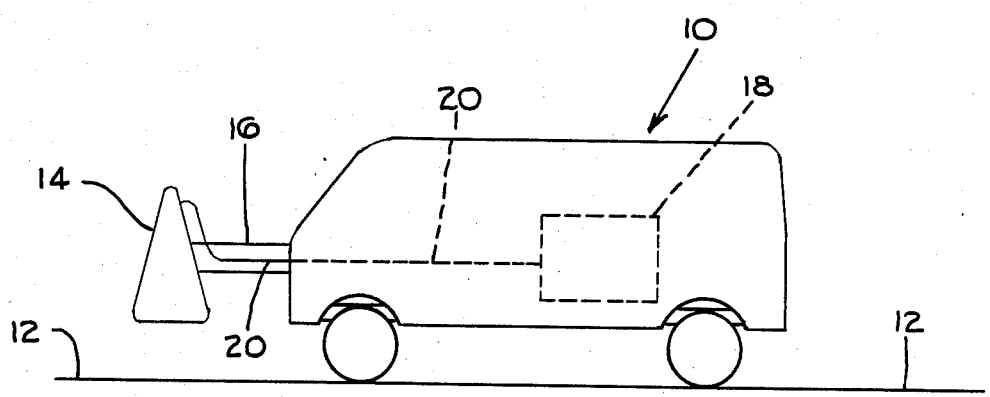
FIG. 1 is a diagrammatic view illustrating a downward looking, short pulse high resolution radar as it would appear in use inspecting highway and pavement surfaces.

FIG. 1 illustrates a downward-looking, short pulse high resolution radar as it would appear in use carried by a vehicle 10 for movement over and along a roadway surface 12 to be inspected such as the pavement of a highway or bridge deck. The radar includes a broad band, non-dispersive antenna 14 which in the present illustration is mounted on the front of van 10 by a suitable bracket 16 and located and oriented as shown to be air coupled to pavement 12. Antenna 14 typically has a height of about four feet, a width at the base of about nine inches and is spaced about six inches from pavement 12. Alternatively, antenna 14 can be carried in a similar manner at the rear of vehicle 10. The radar system transmitter, receiver and other components are collectively designated 18 and can be located within vehicle 10 and connected to antenna 14 by a transmission line 20. Briefly, as vehicle 10 proceeds along pavement 12, transmitted pulses of RF energy are radiated downward by antenna 14 into the pavement structure 12, and a portion of the RF energy is reflected whenever there is a change or a discontinuity in the propagation medium. The RF reflection or radar target echo is picked up by antenna 14, coupled into the receiver and processed for display and recording. The time delay of a radar echo from a pavement fault is directly related to the depth of the fault. By utilizing this information and the location of detected faults with reference to fixed highway markers, a qualitative and quantitative analysis of the condition of pavement 12 can be obtained as will be discussed in further detail presently.

Figure 2A:
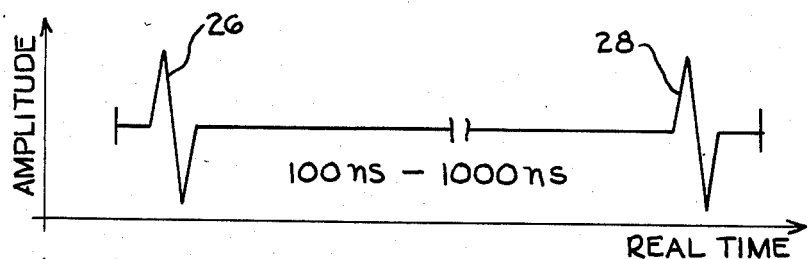
FIG. 2A-2D are graphs including waveforms illustrating the problem addressed by the radar system of the present invention.
Figure 2B:
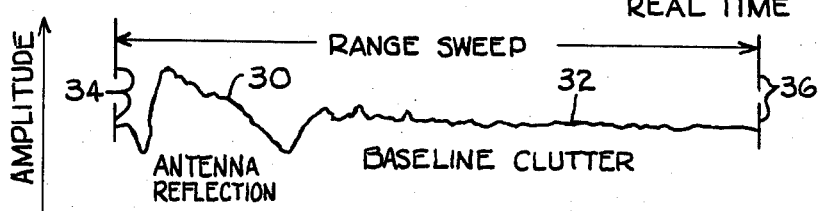
Figure 2C:
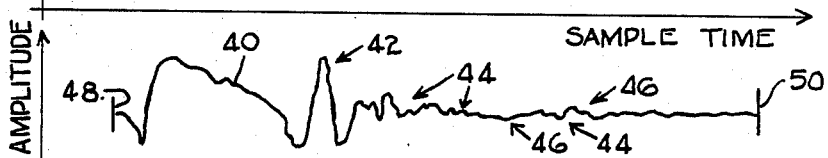
Figure 2D:
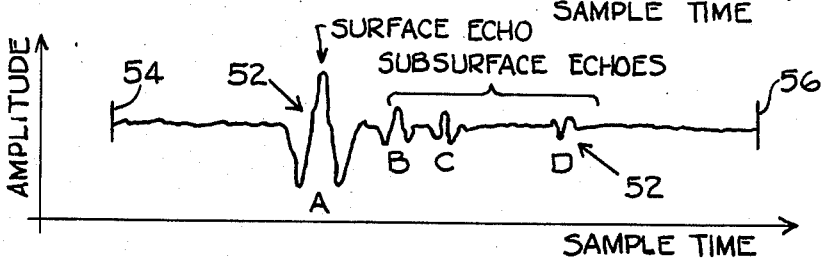
Figure 2E:
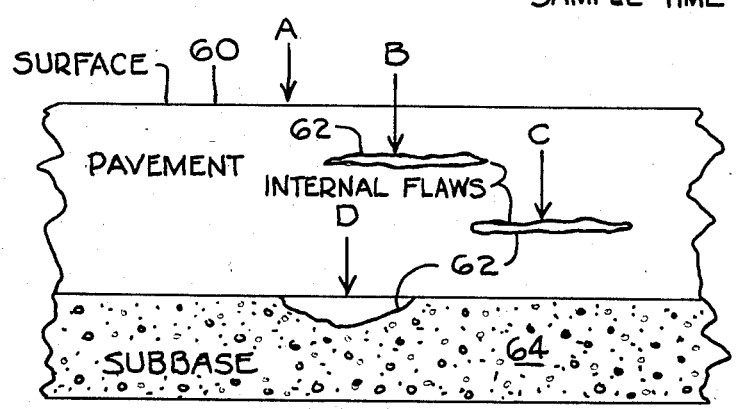
FIG. 2E is a diagrammatic cutaway view of a pavement surface from which the waveforms of FIGS. 2A-2E arise.

The waveforms of FIGS. 2A-2D and the pavement surface cutaway view of FIG. 2E illustrate the internal clutter problem addressed by the radar system of the present invention and the approach thereof. The waveform of FIG. 2A shows the repetitive transmitter signals, with a real time period which can be selected in a range from about 100 nanoseconds to about 1000 nanoseconds between transmitter signals 26 and 28. The waveform of FIG. 2B shows the internal clutter for each range sweep and which comprises antenna reflections 30 and the internal system reflections 32. The range sweep has a duration between the points 34 and 36 in FIG. 2B. The sample time corresponds to depth in the media being inspected. The internal clutter subsequent to the antenna signals occur during the same period of time as the signals of interest from the internal pavement. This baseline clutter signal 32 may be produced by directing the radar system antenna into free space. The clutter cancellation according to the present invention operates by storing a replica of this signal, which then is substracted from the radar signal depicted in the waveform of FIG. 2C. The waveform in FIG. 2C shows a typical radar range sweep consisting of antenna reflections 40, pavement surface echo 42, internal pavement echoes 44 and the internal clutter 46. The range sweep is between points 48 and 50. A perfect clutter cancellation would produce the range sweep shown in the waveform 52 of FIG. 2D comprising the pavement surface and subsurface signals in the absence of internal clutter. In particular, the surface reflection or echo is designated A, and subsurface reflections or echoes are designated B, C and D. The radar range sweep is between points 54 and 56.

Antenna height variations, such as experienced when a radar is vehicular mounted, will cause the surface and subsurface echoes to be displaced in time with respect to the clutter signals. If the radar range sweep is stabilized with respect to the surface or subsurface signals, antenna height variations above the pavement would result in displacement of the clutter signals. Effective cancellation or elimination of internal clutter requires that the radar range sweep be stabilized with respect to the internal clutter as opposed to signals external to the radar system. This allows the internal clutter to remain precisely correlated thereby permitting the clutter in the waveform of FIG. 2B to be subtracted from the signal plus clutter in the waveform of FIG. 2C, on a range sweep by range sweep basis, to yield the signal without clutter shown in the waveform of FIG. 2D. FIG. 2E depicts a cutaway view of a highway pavement showing the sources of the signals in FIG. 2D. In particular, the top surface 60 of the pavement produces echo A of FIG. 2D and internal flaws 62 in the subsurface region of the pavement between surface 60 and a subsurface layer 64 produce echoes B, C and D of FIG. 2D. As the depth of the location of an internal flaw increases, its echo signal occurs later in time relative to surface echo A as can be seen in comparing FIGS. 2D and 2E.

The clutter cancellation according to the system of the present invention differs from that used in conventional radars in that conventional radar clutter cancellers assume the clutter to be stationary and the targets always moving. That feature allows separation of the clutter and moving targets by using MTI or digital filter processing. That approach is not suitable for downward looking, pavement inspection radar because at times there may be no antenna height variation. Therefore, the pavement signals would appear stationary with respect to the clutter and would not be separable. In that case the pavement signals would be cancelled along with the clutter.

Figure 3:
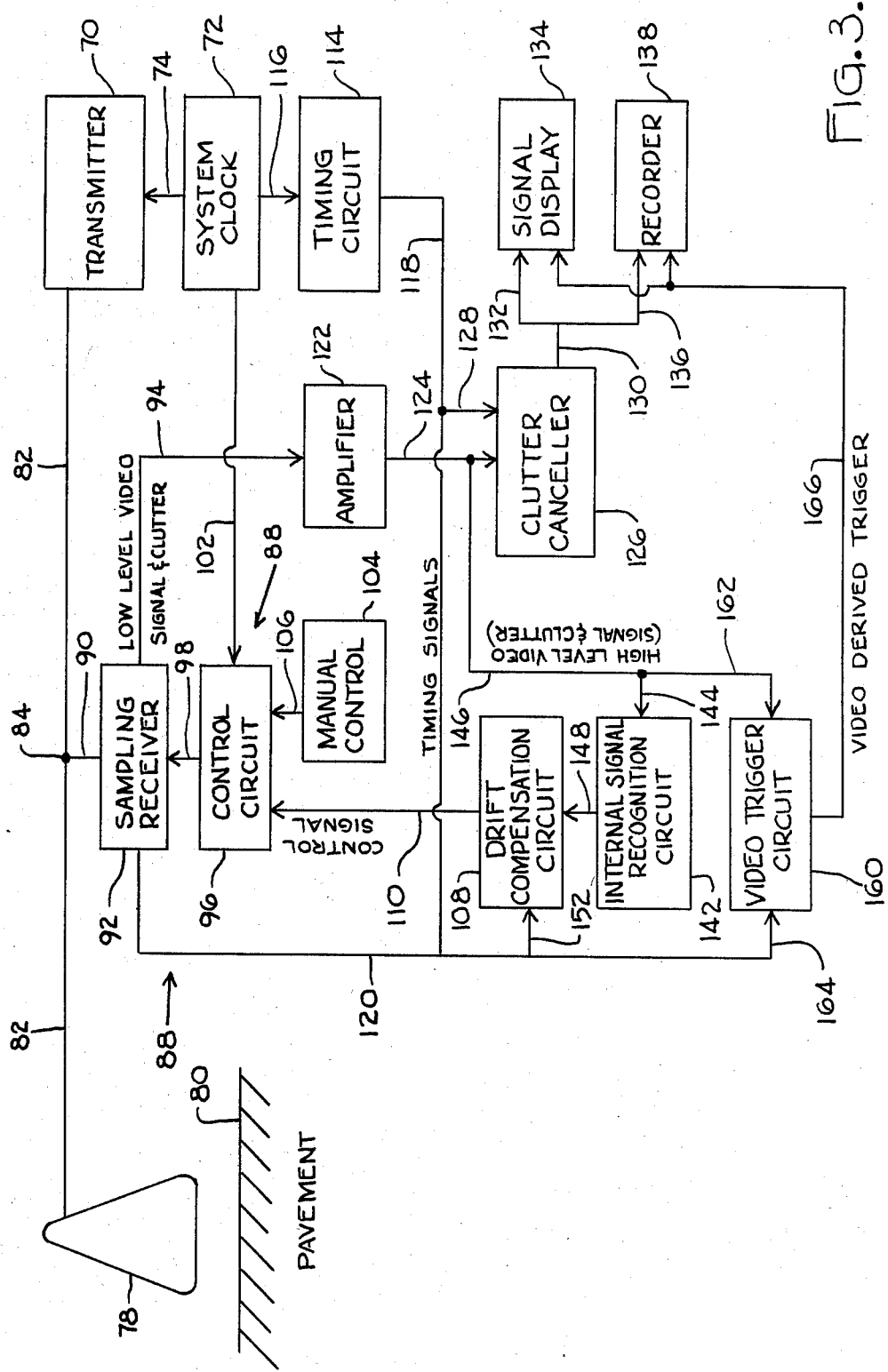
FIG. 3 is a schematic block diagram of the radar system of the present invention.

FIG. 3 shows a block diagram of the subsurface inspection radar system according to the present invention. The system is for inspecting the surface and subsurface region of layers of non-metallic building materials such as pavements of highways, bridge decks, runways and parking ramps and areas as well as floors of factories and warehouses and masonry building structures. Typical materials include asphalt, macadam, concrete and masonry. This system consists of a short pulse transmitter 70 which is commercially available such as the Model AVD nanosecond monocycle pulser manufactured by Avtech Ltd., Ottawa, Ontario, Canada. The transmitter repetition frequency is controlled by a system clock 72 which may operate at a frequency of up to several megahertz. Clock 72 is a commercially available oscillator and connected to transmitter 70 by line 74. The transmitted signal is radiated by a broad band, non-dispersive antenna 78 which is air coupled to the pavement 80 or similar surface undergoing inspection. Antenna 78 is of the same type as antenna 14 in FIG. 1. Antennas of this type are commercially available from Penetradar Corporation, Niagara Falls, N.Y. under model no. PS24A. For a more detailed description of antennas of this type, reference may be made to the article "The GWIA, An Extremely Wide Bandwidth Low Dispersion Antenna", Robert J. Wohlers, *Abstracts of the Twentieth Annual Symposium USAF Antenna Research and Development Program*, Air Force Avionics Laboratory, Wright Patterson Air Force Base, Ohio, Oct. 13–15, 1970, pages 1–37, the disclosure of which is hereby incorporated by reference. The transmitter 70 connects via a coaxial transmission line 82 to a sampling receiver junction point 84 and from there to the antenna input. The reflected signals arising from the surface, from discontinuities or flaws within the pavement 80 such as delamination, from the bottom of the pavement and beneath the pavement, and coupled by antenna 78 to the system sampling receiver.

In particular, the system comprises receiver means generally designated 88 coupled to antenna 78 by line 90 leading from sampling point 84 for providing output signals in response to external reflections from pavement 80. Receiver 88 comprises a sampling receiver 92 which, for example, is similar to a Tektronix model 7T11 sampling sweep unit and 7S11 sampling unit. Line 90 is connected to the input of sampling receiver 92 and line 94 leading from the receiver output carries a low level video output signal consisting of signal plus clutter. There is provided a control circuit 96 connected by line 98 in controlling relation to sampling receiver 92. Control circuit 96 comprises a voltage controlled delay line for delaying the strobe trigger pulse going to the sampling receiver 92 on a variable basis. Control circuit 96 is similar to the Tektronix Model 7M11 Fixed Delay Unit, however, it would provide continuously variable delay as opposed to a fixed delay of the sampling receiver strobe. This is required to compensate for system thermal drift and to provide a manually positionable sampling sweep anywhere within the radar pulse repetition interval.

Clock pulses from system clock 72 are applied by line 102 to control circuit 96. The output of a manual control 104, which can be a potentiometer, is connected by a line 106 to a control circuit 96 and an control signal output from a drift compensation means 108 which will be described is applied by line 110 to control circuit 96. The signals are summed in circuit 96 and used to control the output of the voltage controlled delay line thereof. Thus, the sampling receiver control circuit 96 utilizes the pulse repetition frequency (PRF) from the system clock 72 and signals from drift compensation means 108 and manual control 104 to generate a trigger signal for the sampling receiver 92. The manual control 104 causes a variable delay in the trigger signal for the sampling receiver 92 with respect to the system clock 72 to allow the start of the sampling process to be variable in time and to compensate for fixed delays in the system. The sampling process converts the received RF return signal to the audio based frequencies to accommodate display and processing. The radar sampling process is permissible when the changes in the echoes from each RF transmission, due to radar inspection motion, are small during the time interval of the periodic sweep or radar range sweep. Transmitter 70 and receiver 88 are always on at the same time, and transmission line 82 is sufficiently long to provide time separation between subsurface signals of interest and multiple reflections between sampling point 84 and transmitter 70.

There is provided a timing circuit 114, the input of which is connected by line 116 to system clock 72 and the output of which comprises several lines collectively designated 118 containing timing signals for various portions of the system. The timing circuit 114 can include well-known frequency dividers for operation on pulses from system clock 72. Line 120 is connected from lines 118 from timing circuit 114 to sampling receiver 92 to provide an external timing reference for the sampling sweep in the sampling receiver. The output of sampling receiver 92 on line 94 is applied to the input of an amplifier 122 to provide gain for the low level audio frequency return signals present in the output of receiver 92. Amplifier 122 is a conventional audio amplifier and the output is on line 124.

The system of the present invention further comprises clutter cancellation means 126 operatively connected to receiver means 88 for eliminating internal reflections developed in the system to prevent interference by those internal reflections with the desired external reflections to enhance the system detection capability and reliability of evaluation of the external reflections. Briefly, the clutter cancellation means 126, which will be described in detail presently, operates to store stationary internal clutter signals and then to subtract the stored stationary clutter signals from subsequent signals comprising desired external reflections and unwanted internal reflections. The input of clutter cancellation means 126 is connected to line 124 from the output of amplifier 122 and thus is operatively connected by amplifier 122 to receiver means 88. The signal applied to the input of clutter canceller 126 is a high level video signal in the form of surface and subsurface signals plus internal clutter. Timing signals from lines 118 are applied by line 128 to clutter canceller 126. The output of clutter cancellation means 126 is on line 130 and is in the form of the surface and subsurface reflection signals without internal clutter. This output, in turn, is connected by line 132 to the input of a signal display 134 and is connected by line 136 to the input of a signal recorder 138. Display 134 and recorder 138 each comprise means for utilizing the output signal from clutter canceller 126 to provide information as to the condition of the subsurface region being inspected. By way of example, display 134 can be a Tektronix 2235 oscilloscope and recorder 138 can be a Hewlett Packard 3964A instrumentation tape recorder.

The system of the present invention further comprises internal signal recognition means 142 operatively connected to receiver means 88 for rejecting all return signals except that generated internally to the radar system by the antenna means 78 to provide an internal reference signal whereby the radar system is relatively insensitive to wide variations in external reflection characteristics caused by wide variations in the nature of materials present in the surface being inspected. This, in turn, provides for a reliable control of the receiver sampling process which is independent of external signals and of their amplitude variations. The nature and operation of the internal signal recognition means 142 will be described in detail presently. The input is connected by lines 144 and 146 to line 124 from the output of amplifier 122. The output of internal signal recognition means 142 is connected by line 148 to the input of drift compensation means 108, the output of which is connected by line 110 to control circuit 96. Timing signals from lines 118 are applied by line 152 to drift compensation means 108.

Figure 4:
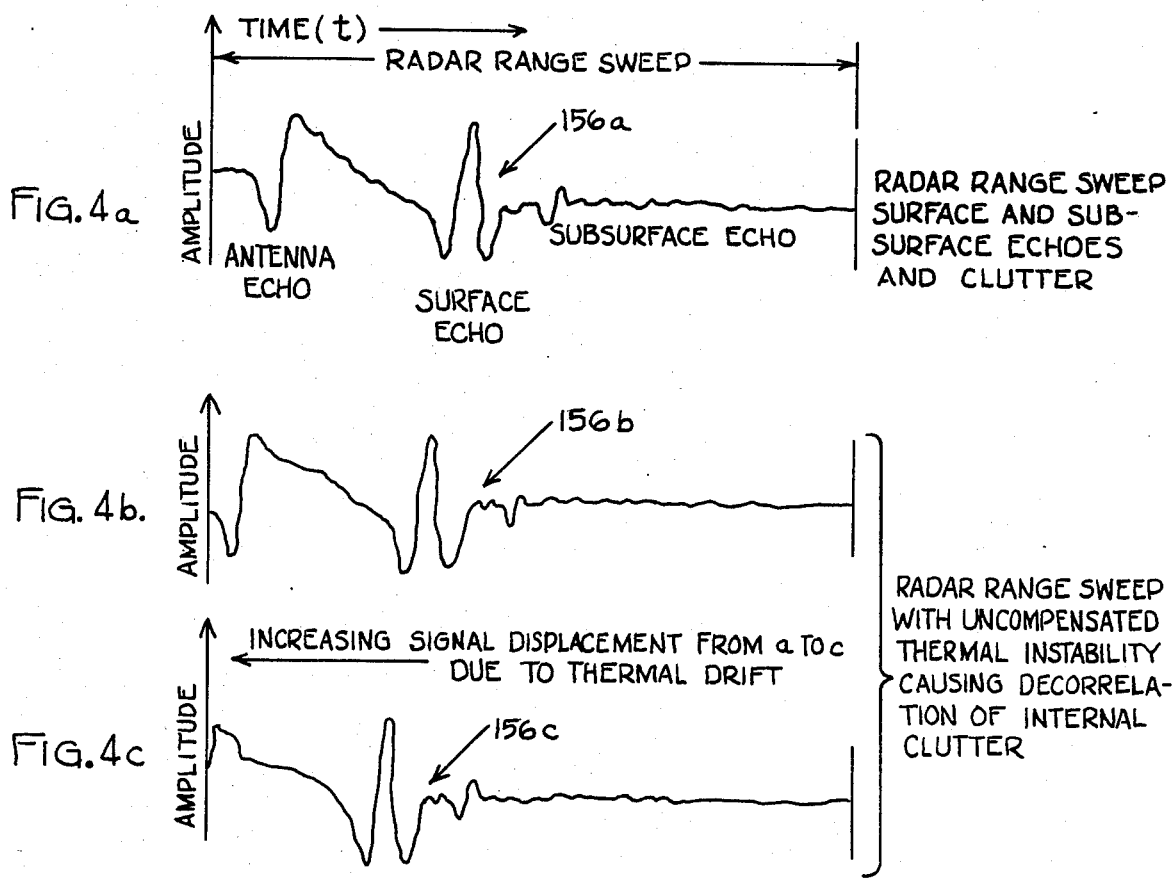
FIGS. 4A-4C are graphs including waveforms illustrating a clutter decorrelation problem caused by thermal drift.

The signal recognition circuit 142 will reject all return signals but that generated internally to the radar by the antenna structure, and this internal antenna echo is used by the drift compensation circuit 108 to generate a DC control signal proportional to the amount of signal displacement in time due to thermal drift. The DC control signal from the drift compensation circuit 108 to the receiver 88 compensates for temperature instabilities in the radar system. These temperature instabilities produce a shift in the sampler strobe with respect to the system clock resulting in external signals and internal clutter shifting in time. The sampling receiver 92 and control circuit 96, amplifier 122, internal signal recognition circuit 142 and drift compensation circuit 108 form a closed loop to stabilize the starting point of the sampling and also the internally generated clutter. The closed loop stabilization allows the internal clutter to remain correlated on a range sweep by range sweep basis. This avoids the problem of decorrelation of internal clutter illustrated by waveforms 156a, 156b and 156c in FIGS. 4a, 4b and 4c, respectively. This allows long term cancellation of the internally generated clutter to be possible. Without the drift compensation circuit 108, short term clutter cancellation would be possible but eventually long term temperature drift would seriously degrade the clutter cancellation process. If thermal drift in the system were non-existent the drift compensation circuit 108 would be unnecessary and manual control would be all that is necessary to vary the start of the sampler strobe (range sweep). The internal signal recognition means 142 and drift compensation means 108 will be described in further detail presently.

The radar system of the present invention further comprises a video trigger circuit 160 having an input connected by line 162 to lines 146 and 124 from the output of amplifier 122, having a connection via line 164 to line 118 containing system timing signals, and having an output connected by line 166 to trigger or control inputs of display 134 and recorder 138. The video trigger circuit 160, which will be described in detail presently, produces an output trigger pulse derived from the radar video and referenced to an external radar echo such as the echo from the surface. By way of example, in an illustrative system, system clock 72 operates at 5 megaherz and timing signals on line 118 have a frequency of 50 herz.

Figure 5:
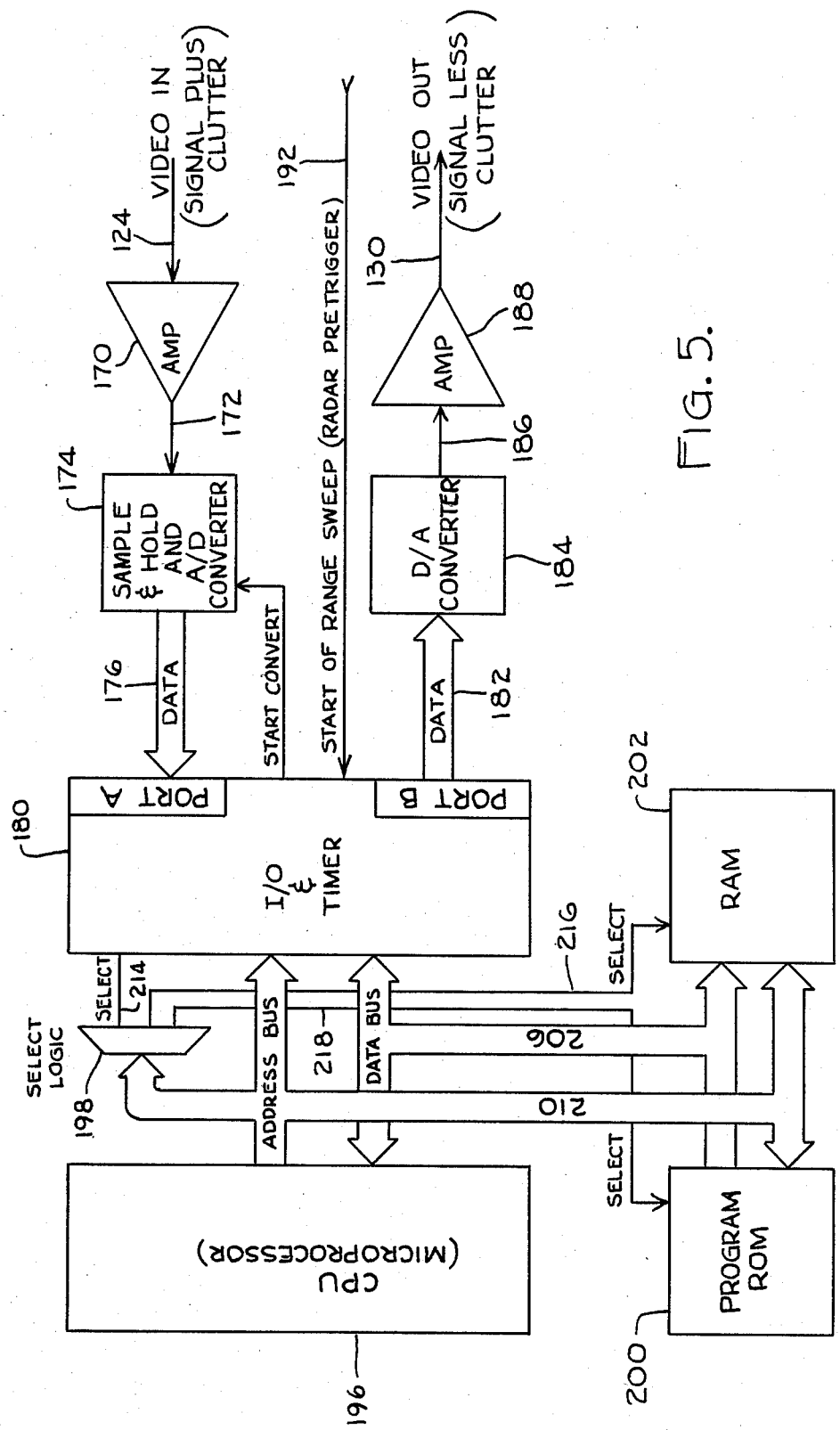
FIG. 5 is a schematic block diagram illustrating in further detail the clutter cancellation means of the system of FIG. 3.

The clutter cancellation means 126 is shown in further detail in FIG. 5. The circuit of FIG. 5 operates by storing the internally generated clutter and subsequently subtracting it from each incoming radar range sweep consisting of surface and subsurface signals plus unwanted clutter. After clutter cancellation the range sweep consists of surface and subsurface signals without clutter. In particular, the video input on line 124 consisting of signal plus clutter is applied to the input of an amplifier 170, the output of which is connected by a line 172 to the input of a sample and hold and analog-to-digital converter combination 174. By way of example, the sample and hold circuit can be a National Semiconductor LM198 and the analog-to-digital converter can be an Analog Devices AD573. The output of combination 174 is connected by a data bus 176, for example an eight bit bus, to an input port of an input/output and timer component 180. By way of example, components 180 can be a Rockwell model 6522A. An output port of I/O and Timer component 180 is connected by a data bus 182, for example an eight bit bus, to the input of a digital to analog converter 184, the output of which is connected by line 186 to the input of an amplifier 188. By way of example, converter 184 can be a National Semiconductor model DAC 1020 LCN. The output of amplifier 188 is connected to line 130. Timing signals indicating start of the range sweep on line 128 are connected to the I/O and timer component 180. Command signals for starting the analog-to-digital conversion are conveyed from component 180 by line 192 to combination 174.

The data processing circuit of FIG. 5 further comprises a central processing unit 196, a select logic component 198, a program ROM 200 and a RAM 202. By way of example, in an illustrative system central processor 196 is a Rockwell 6502A eight bit microprocessor, select logic component 198 is a ⅜ decoder, program ROM 200 is a 4K×8 National Semiconductor 2732 EPROM, and RAM 202 is a 2K×8 National Semiconductor 6116 CMOS RAM. An eight bit data bus 206 is connected to I/O and Timer 180, CPU 196, ROM 200 and RAM 202 as shown in FIG. 5 with the directions of data flow indicated by the arrows. Similarly, a 16 bit address bus 210 is connected to I/O Timer 180, select logic component 198, CPU 196, ROM 200 and RAM 202 as shown in FIG. 5 with the directions of address flow indicated by the arrows. Outputs from select logic component 198 are connected by lines 214, 216 and 218 to I/O Timer 180, RAM 202 and ROM 200, respectively.

In a store clutter mode of operation, the circuit of FIG. 5 stores a single radar range sweep consisting only of internally generated clutter. This is implemented by directing antenna 78 into free space and via amplifier 170 accepting the radar video signal consisting of clutter only, in analog form, and delivering this signal to the sample and hold and A/D converter 174. Upon receiving a start of range sweep signal, i.e. a pretrigger signal, on line 128 from the timing circuit 114, which indicates a new radar range sweep has occurred, the I/O and timer circuit 180 starts the A/D conversion process via a start convert command on line 192. At this time the free running interval timer within the I/O timer circuit 180 is initiated to start subsequent A/D conversions at regular intervals throughout the range sweep. The digital word from the A/D converter 174 is brought into input port A of circuit 180 upon completion of conversion. The CPU 196, operating from instructions in ROM 200, transfers the data into a predetermined location in RAM memory 202. This entire procedure is repeated for each sample point or A/D conversion in the radar range sweep.

In a clutter cancel mode of operation the radar range sweep, consisting of surface and subsurface signals plus internal clutter, is sampled, digitized and brought into input port A of I/O and Timer 180 in a similar manner to that previously outlined. The first digitized value, entering the input port A after the start of the range sweep, is transferred to the CPU 196 where the first stored value in RAM memory 202, representing the magnitude of the clutter only in the first sample, is subtracted from it in a binary fashion. The result of this subtraction yields the magnitude of the radar signal less the internal clutter for that particular sample point. Subsequent digitized values during the range sweep have clutter eliminated in the same manner. The desired video signal, consisting of surface and subsurface signals less clutter, is reconstructed via data transfer from output port B of I/O and Timer 180 to D/A converter 184 and amplifier 188.

Figure 6D:
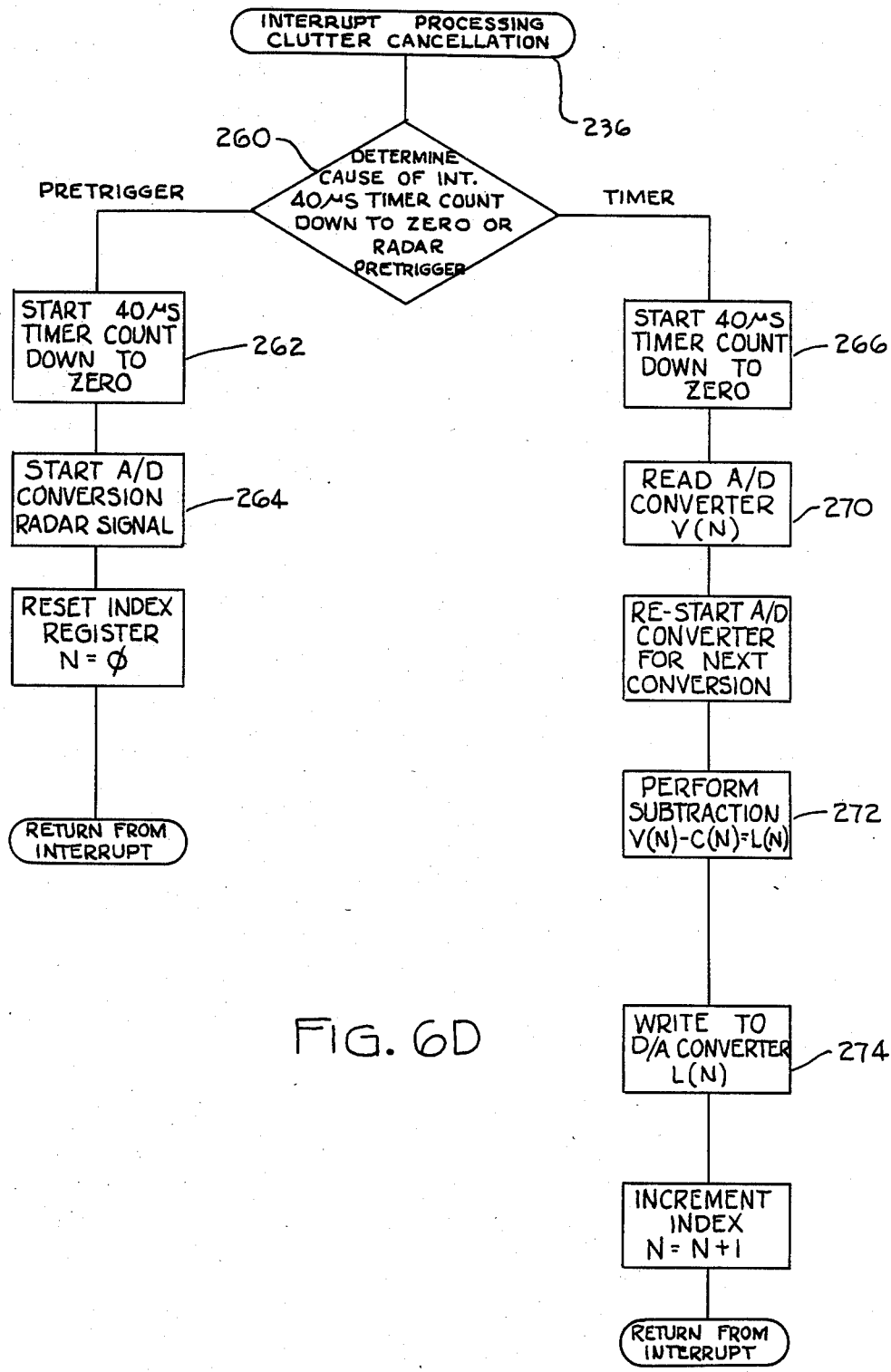

FIGS. 6A-6D are program flow charts further illustrating operation of the clutter cancellation means 126 of FIG. 5. FIG. 6A shows a main program entered at 230, FIG. 6B shows a store clutter subroutine entered at 232, FIG. 6c shows a store clutter processing routine entered at 234 and FIG. 6D shows a clutter cancellation processing routine entered at 236. The program is in assembly language and operates at machine code speed. Referring first to the main program of FIG. 6A, the microprocessor 196 of FIG. 5 is reset and initialization of system variables, I/O ports and registers takes place. A jump to the store clutter subroutine takes place where a single range sweep, consisting of clutter only, is stored in memory, i.e. RAM memory 202 of FIG. 5. The range sweep consisting of clutter only is obtained by pointing antenna 78 into free space, this being done preferably before each inspection operation to be performed by the system. In particular, when a timing signal on line 128 of FIG. 5 corresponding to the beginning of the range sweep, referred to as the pre-trigger, is encountered, a pre-trigger interrupt occurs and is processed at 240 in the store clutter routine of FIG. 6C. As indicated at 242 a timer (in component 180 of FIG. 5) is started in a count down cycle, and as indicated at 244 an analog-to-digital conversion (in component 174 of FIG. 5) of the clutter signal also begins. The system returns from this interrupt to the store clutter subroutine of FIG. 6B and then continues in an unconditional loop. When the timer counts down to zero a timer interrupt occurs which directs the system to the store clutter interrupt processing routine. The count down timer is restarted as indicated at 248 in FIG. 6C and the A/D converter is read as indicated at 250. The A/D value corresponding to a single sample of the radar clutter is stored in memory (RAM memory 202 of FIG. 5) as indicated at 252 in FIG. 6C. This process proceeds until an entire radar range sweep is stored in consecutive memory locations. By way of example, in an illustrative system, a sample of the radar range sweep is taken every 40 microseconds, the duration of the timer count-down to zero, and the timer interrupt occurs about 500 times during each range sweep. The exact number of timer interrupts per range sweep is the value of N in the program flow chart.

After the conclusion of the foregoing store clutter process, the next or following pre-trigger interrupt and subsequent timer interrupts will direct the system to the clutter cancellation interrupt routine of FIG. 6D. Here the incoming radar video signal plus clutter is digitized and has subtracted from it the corresponding clutter value which was previously stored in memory. In particular, at the start of range sweep a pre-trigger interrupt occurs which is processed at 260, then a timer is started in a count down cycle as indicated at 262, and then an analog-to-digital conversion of the signal plus clutter occurs as indicated at 264. The system returns from this interrupt to the main program of FIG. 6A and continues in an unconditional loop. When the timer counts down to zero a timer interrupt occurs which directs the system to the clutter cancellation interrupt processing routine of FIG. 6D. The count down timer is restrated as indicated at 266 in FIG. 6D and the A/D converter is read as indicated at 270. The stored digitized sample of clutter C(N) is substracted from the digitized sample of signal plus clutter V(N) as indicated at 272. This process continues until an entire radar range sweep has the stored clutter cancelled therefrom. The result of the foregoing operation is output to D/A connector 184 as indicated at 274 in FIG. 6D which recreates the radar video signal without clutter.

The foregoing program is interrupt driven which allows for synchronous or coherent clutter cancellation. This is in contrast to a program using polling techniques which would be asynchronous. In particular, it would not be desirable to subtract, for example, C(100) from V(98) because this would not be a coherent and synchronous substraction of clutter.

The block diagram of FIG. 7 and the waveforms of FIGS. 8A-8D illustrate in further detail the nature and operation of the internal signal recognition means 142. As shown in FIG. 7, internal signal recognition means 142 comprises a smoothing filter 280, the input of which is connected to line 144 in FIG. 3 and the output of which is connected to the input of a zero crossing detector 282. The internal signal recognition means 142 further comprises a differentiating and baseline clipping circuit 284, the input of which is connected to the output of detector 282 and the output of which is connected to line 148 in FIG. 3. Waveform 286 in FIG. 8A is the high level video input to filter 280, i.e. radar signal plus internal clutter. Waveform 290 in FIG. 8B is the output of filter 280. Waveform 292 in FIG. 8C is the output of zero crossing detector 282, and waveform 294 in FIG. 8D in the output of circuit 142 on line 148.

As previously described, to cancel internal radar clutter an initial range sweep of the clutter is stored in memory. The cancellation process consists of the subtraction of the stored clutter data from the combined signal plus clutter. This is done on a range sweep by range sweep basis. Thermal drifts causing phase variations in the sampler strobe trigger pulse will shift in time the incoming signal plus internal clutter with respect to the stored clutter. Without time correlation between the two signals, clutter cancellation can be ineffective. A method according to the present invention for eliminating thermal drift utilizes the internal signal recognition circuit 142 and the drift compensation circuit 108. The high level video signal including internal clutter (FIG. 8A) is coupled from amplifier 122 in FIG. 3 to internal signal recognition circuit 142. The internal signal recognition circuit generates a signal (FIG. 8D) in response to an internal clutter signal caused by the antenna or any other suitable internal clutter signal (FIG. 8A). The signal in FIG. 8D is coupled to the drift compensation circuit 108, which is a centroid detector similar to those found in many radar range tracking circuits. This type of circuit is described in detail in *RADAR HANDBOOK* by M. I. Skolnik, McGraw Hill, 1970. pp 21-40, 41, 42, the disclosure of which is hereby incorporated by reference. A control signal is produced by the drift compensation circuit which, when applied to the control circuit 96 in FIG. 3, stabilizes the start of the range sweep with respect to the internal clutter thereby permitting correlation of the incoming clutter with respect to the stored clutter. This allows effective clutter cancellation.

The block diagram of FIG. 9 and the waveforms of FIGS. 10A-10F illustrate in further detail the nature and operation of video trigger circuit 160. As previously described, the video signal from amplifier 122 in FIG. 3 also is coupled to the video trigger circuit which produces an output trigger derived from the radar video. This output trigger pulse is referenced to an external radar echo such as the surface echo, and it is used for triggering external accessory equipment such as display 134 and recorder 138. As shown in FIG. 9, video trigger circuit 160 comprises a range gate generator 300 to which timing signals are applied by line 164 in FIG. 3, The output of generator 300 is connected to one input of a gate circuit 302, the other input of which is connected to line 162 in FIG. 3. The output of gate 302 is connected to the input of a differentiating circuit 304, the output of which is connected to the input of a zero crossing detector 306. The output of detector 306 is connected to line 166 in FIG. 3. Waveform 310 in FIG. 10A is the high level video input to gate 302, waveform 312 in FIG. 10B id the timing signal to generator 300 and waveform 314 in FIG. 10C is the output of range gate generator 300. Waveform 316 in FIG. 10D is the range gated video output of gate 302. Waveform 318 in FIG. 10E is the differentiated range gated output of differentiator 304 and waveform 320 of FIG. 10F is the output of zero crossing detector 306 which is the video derived trigger signal on line 166 in FIG. 3. The range gate waveform 314 in FIG. 10C is produced in response to timing circuit signals 312 shown in FIG. 10B and is applied to the radar video signal 310 of FIG. 10A. The range gate 314 is positioned in time to allow only the first external radar signal to be present, i.e. the surface echo. The duration of the gate is such that it permits the first external echo to be passed as shown in FIG. 10D, with antenna heights ranging from 0 to 12" typically. The gated signal consisting of the surface echo only is then differentiated as shown in FIG. 10E and applied to a zero axis crossing detector to produce waveform 320 shown in FIG. 10F. The location where the differentiated signal crosses the zero axis corresponds to the peak of the original surface echo as indicated by broken line 322 in FIG. 10. The output of the zero crossing detector 306 is the video derived trigger signal.

The radar system of the present invention operates in the following manner. It is carried by a vehicle for inspection of the pavement of a roadway in a manner similar to that shown in FIG. 1. It can inspect bridge decks for delamination and deterioration, inspect highway pavement for voids, measure thickness of pavement layers non-destructively, and inspect runways, parking lots and ramps, factory and warehouse floors, factory sites and masonry structures, to mention a few areas. The downward looking antenna 78 illuminates an area of approximately one square foot and the roadway can be inspected continuously at moderate vehicle speeds. Transmitted pulses of RF energy are radiated by the radar antenna 78 downward into the pavement structure. A portion of the RF energy is reflected wherever there is a change or discontinuity within the pavement such as a delamination in a bridge deck or below the highway as in a void. The RF reflection or radar target echo is picked up by the antenna 78, coupled into the receiver 88 and processed for display and recording.

The radar receiver 88 actually can be considered a very accurate electronic stop watch in that it makes a measurement of the time it takes for the transmitted pulse to travel to a target discontinuity and for the radar echo to return. Typically in air or free space a radar pulse will go out 5.9 inches and return in one nanosecond. In concrete the velocity of propagation of RF is reduced so that the distance out and back the RF pulse travels is about $2\frac{1}{4}$ inches in one nanosecond. Therefore, the time delay of a radar echo from a pavement fault discontinuity is directly related to the depth of the fault. The radar echo from the pavement surface is always produced and displayed first and is generally much stronger than the other echoes from beneath the surface. The surface echo signal contains useful properties and information. The depth of a discontinuity is measured directly by noting the time separation between the surface and the pavement fault echo. The amplitude of the surface echo signal is different for different materials such as concrete or macadam thus permitting its identification. Faults within the pavement such as delamination and facturing occur after the surface echo but before the echo from the bottom boundary of the pavement.

The amplitude of the echo signal within bad pavement is generally several times that of echoes within concrete pavement in good condition The echo signal from the pavement bottom boundary has an easily recognized characteristic waveshape and polarity when a void is present as compared to the non-void situation. In addition the amplitude of the void signal varies with the thickness of the void for thicknesses of up to three inches (for example when transmitting a one nanosecond pulse) thus permitting thickness estimates to be made. When the void thickness exceeds three inches the signal waveshape stretches in width as well, until the void thickness is greater than six inches then the signal waveshape starts to divide into two separate waveshapes indicating resolution of the upper and lower boundaries of the void by the radar.

Therefore detailed information on a pavement fault is obtained by observing the time delay of the radar echo with respect to the surface echo, the amplitude, shape, polarity and Width of the signal. Similarly layered material properties such as thickness and depth may also be determined from the signal characteristics.

A typical downward looking radar, vehicular mounted, has an inspection path 13 inches wide and continuous in length. The inspection path may b positioned laterally as desired, by adjusting or modifying the antenna mounting structure on the vehicle. Multiple units have been mounted side by side, laterally, to produce a wider inspection path. Three units for example provide an inspection path width of about 40 inches, the width may be further increased by allowing some separation between inspection paths.

Use of the radar inspection system permits rapid and continuous inspection of pavement and bridge deck structures so that accurate estimates of the magnitude of the repair job may be made economically and objectively based on explicit and quantitative measurement data. This inspection technology allows for earlier detection of pavement and bridge deck faults with the subsequent application of preventive measures. Because inspection is continuous the sampling error as encountered in discrete inspection methods is minimized.

In the radar system of the present invention, the foregoing is provided in a manner having enhanced detection capability and reliability of evaluation of the surface being inspected due to elimination of internal multiple reflections or internal clutter in the system. Furthermore, the elimination of internally-generated clutter is on a long term basis due to the thermal drift compensation provided by the system of the present invention. In addition, there is provided reliable control of the sampling receiver process which is independent of external signals and of their amplitude variations.

It is therefore apparent that the present invention accomplishes its intended objects. While an embodiment of the present invention has been described in detail, that is for the purpose of illustration, not limitation.

We claim:

1. A radar system for subsurface inspection comprising:
   (a) transmitter means for generating short pulse signals;
   (b) antenna means spaced from and movable over a surface to be inspected for radiating said signals to and receiving external reflection from said surface and from below said surface, said external reflections being developed external to said system and comprising a plurality of signals spaced in time and each having a characteristic waveshape;
   (c) receiver means coupled to said antenna means for providing output signals in response to said external reflections; and
   (d) clutter cancellation means operatively connected to said receiver means for eliminating internal reflections developed in said system to prevent interference by said internal reflections with the desired external reflections to enhance the system detection capability and reliability of evaluation of said external reflections, said internal reflections comprising signals generated within said system by said antenna means, said transmitter means and said receiver means.

2. A system according to claim 1, wherein said clutter cancellation means comprises:
   (a) means for storing stationary clutter signals; and
   (b) means for subtracting said stored stationary clutter signals from subsequent signals comprising said desired external reflection and unwanted internal reflection.

3. A system according to claim 1, wherein said clutter cancellation means comprises:
   (a) analog to digital converter means for receiving signals from said receiver means;
   (b) digital data processing means operatively connected to said converter means for storing stationary clutter signals and for subtracting said stored stationary clutter signals from subsequent signals comprising said desired external reflections and unwanted internal reflections; and
   (c) digital to analog converter means operatively connected to said data processing means for providing said desired external reflections.

4. A system according to claim 1, further including means for compensating for thermal drift to permit long term cancellation of internally generated clutter.

5. A system according to claim 1, further including internal signal recognition means and drift compensation means coupled together and to said receiver means in a manner providing closed loop stabilization to allow internal clutter to remain correlated on a range sweep by range sweep basis.

6. A system according to claim 1 further including video trigger circuit means operatively connected to said receiver means for producing trigger signals referenced to one of said external reflection for triggering accessory equipment such as display or recorder.

7. A system according to claim 6, wherein said trigger circuit means comprises:
   (a) a range gate generator having an input connected to a source of timing pulses in said system;
   (b) a gate having one input operatively connected to said receiver means and having another input connected to the output of said generator;
   (c) a differentiating circuit having an input connected to the output of said gate; and
   (d) a zero crossing detector having an input connected to the output of said differentiating circuit.

8. A radar system for subsurface inspection comprising:
   (a) transmitter means for generating short pulse signals;
   (b) antenna means spaced from and movable over a surface to be inspected for radiating said signals to and receiving external reflections from said surface and from below said surface, said external reflections being developed external to said system and comprising a plurality of signals spaced in time and each having a characteristic waveshape;
   (c) receiver means coupled to said antenna means for providing output signals in response to said external reflections; and
   (d) internal signal recognition means for rejecting all return signals except that generated internally to said system by said antenna means to provide a reference signal whereby said radar system is relatively insensitive to wide variations in external reflection characteristics caused by wide variations in the nature of the materials present in the surface being inspected.

9. A system according to claim 8 further including means for coupling the output of said internal signal recognition means to said receiver means to provide reliable control of the sampling process of said receiver means independent of external signals and amplitude variation thereof.

10. A system according to claim 9, wherein said coupling means comprises a drift compensation circuit.

11. A system according to claim 8, wherein said internal signal recognition means comprises:
   (a) a smoothing filter;
   (b) a zero crossing detector having an input connected to the output of said filter; and
   (c) a differentiating and baseline clipping circuit having an input connected to the output of said zero crossing detector.

12. A method for inspecting roadway and similar building surfaces comprising the steps of:
   (a) generating short pulse signals;
   (b) radiating said generated signals onto a surface to be inspected;
   (c) receiving information signals reflected from said surface and from a region below said surface;
   (d) cancelling clutter reflections internal to a signal generating and receiving system from a composite signal comprising said reflected information signals and said clutter reflections to provide a processed signal containing only said reflected information signals; and
   (e) utilizing said processed signal to provide information about said surface and the region below said surface.

13. A method according to claim 12, wherein said step of cancelling clutter reflections comprises:
   (a) storing said clutter reflections; and
   (b) substracting the stored signal from each subsequent composite signal.

14. A method according to claim 13 wherein said step of substracting is done on a range sweep by range sweep basis.

15. A method according to claim 12 wherein said step of cancelling clutter reflections comprises:
   (a) digitizing said clutter reflections;
   (b) storing the digitized clutter reflections;
   (c) digitizing each subsequent composite signal
   (d) substracting the stored digitized clutter reflection from the digitizing composite signal; and
   (e) converting the result to an analog signal.

16. A method according to claim 15, wherein said steps of storing and substracting are done on a sample by sample basis over an entire radar range sweep.

17. A method according to claim 15, wherein said steps of digitizing, storing and substracting are performed by an interrupt driven program to provide synchronous and coherent clutter cancellation.

* * * * *